UNITED STATES PATENT OFFICE.

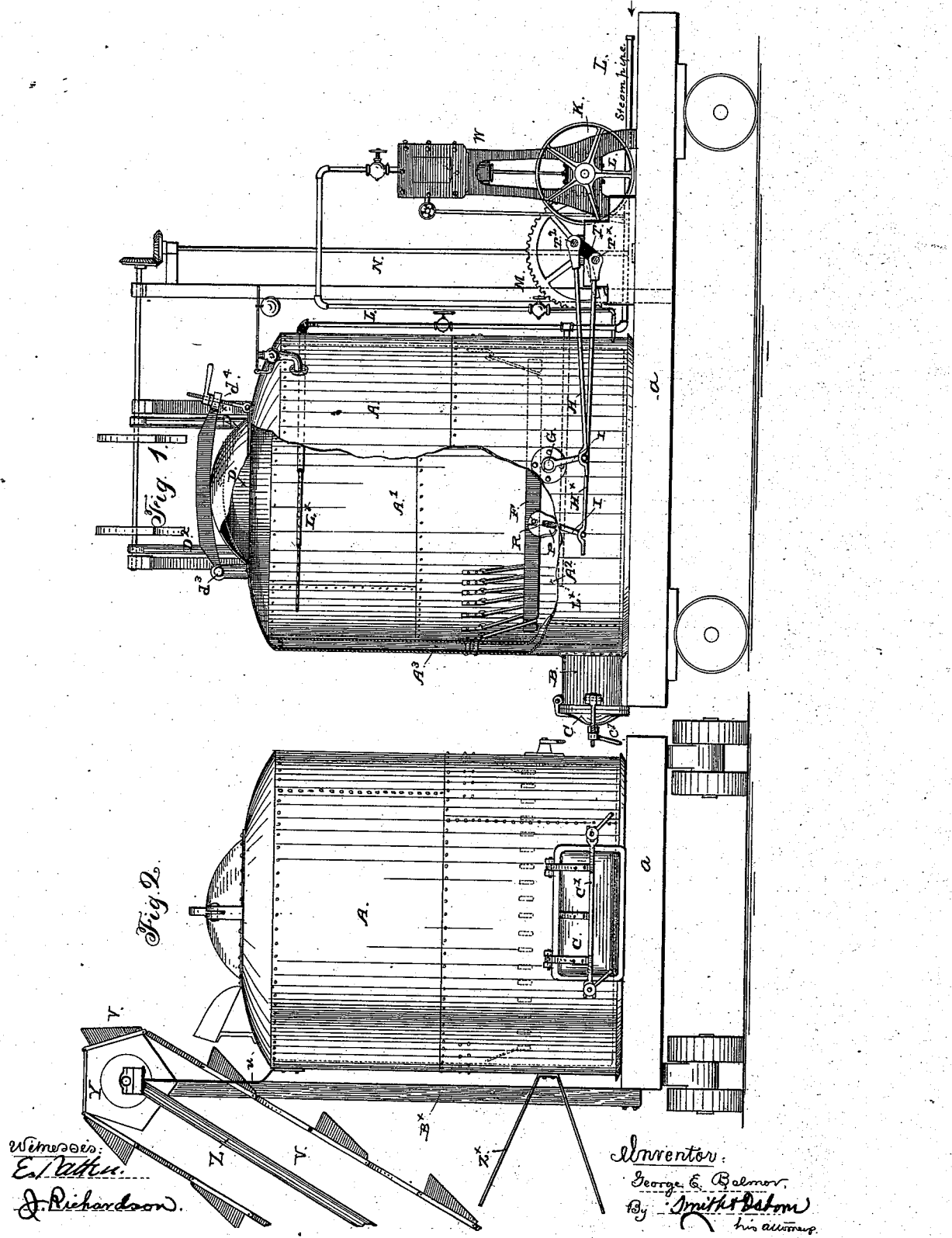

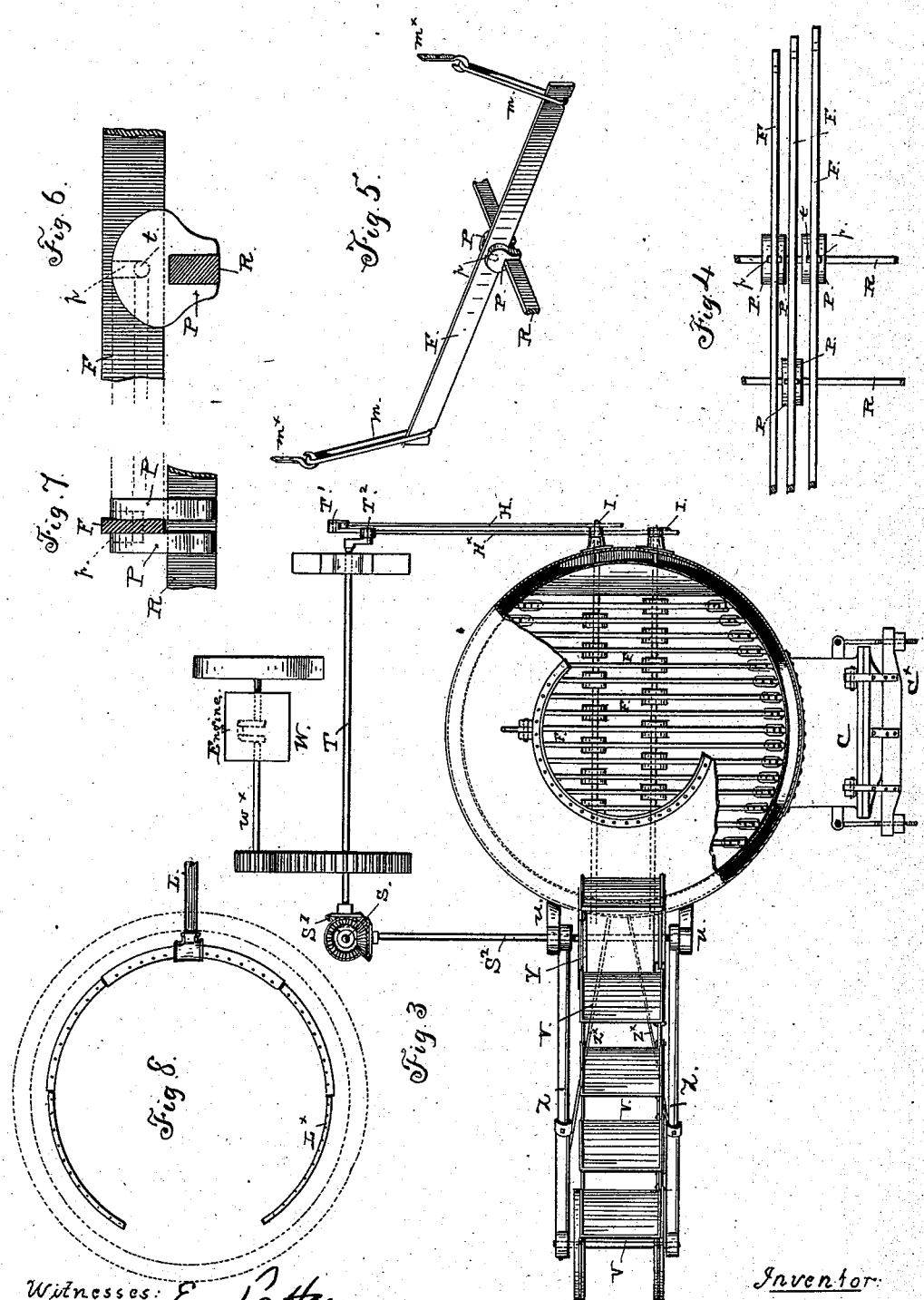

GEORGE E. BELMOR, OF SAN FRANCISCO, CALIFORNIA.

APPARATUS FOR REDUCING BITUMINOUS ROCK.

SPECIFICATION forming part of Letters Patent No. 381,321, dated April 17, 1888.

Application filed September 29, 1887. Serial No. 251,084. (No model.)

*To all whom it may concern:*

Be it known that I, GEORGE E. BELMOR, a citizen of the United States, residing in the city and county of San Francisco and State of California, have invented certain new and useful Improvements in Apparatus for Reducing and Softening Bituminous Rock; and I do hereby declare that the following is a full, clear, and exact description of my said invention, reference being had to the accompanying drawings, that form a part of this specification.

My invention has for its object to produce a portable apparatus for melting and reducing bituminous rock and other similar substances that are being used at the present time as paving material to cover the surfaces of streets and roads; and the points and features thereof which constitute my improvements in and upon such apparatus consist in certain construction and combination of a portable reducing-tank divided by a grate surface into an upper melting or reducing chamber and a lower heating-space with steam coils or pipes in each space and connecting-pipes from them to a steam-supply outside; also, in the construction of such reducing-tank provided with steam-coils of a rocking grate surface; also, in a reducing-tank having a steam-jacket, steam-coils, and a grate-surface; also, in the general combination of parts, producing an improved portable apparatus for reducing bituminous rock and bringing it into a suitable soft and disintegrated condition for making roadways, all as hereinafter fully set forth.

Referring to the accompanying drawings, Figure 1 is a side elevation of my improved apparatus mounted upon a wheeled truck for convenience of moving from place to place as the work progresses. Fig. 2 is a rear elevation. Fig. 3 is a top view of the tank, with a portion of the shell broken away to show the construction of the rocking grate-surface. This view shows, also, the engine and connections to operate the rocking grate and to work the elevator, by which the material is raised from the ground at one side and discharged into the top of the tank. Figs. 4, 5, 6, and 7 are detail views of the parts of the rocking grate-surface, Fig. 4 being a top view of several bars and connections, Fig. 5 a perspective view showing the manner of hanging the grate-bars, and Figs. 6 and 7 are side and end views of the rocking mechanism.

This apparatus is specially constructed and adapted for working bituminous rock, a natural substance which is being used to a considerable extent as a paving material, and which in the present mode of working and using requires to be reduced to a soft and homogeneous mass. Such condition is produced by the application of heat in various ways to the rock for the purpose both of disintegrating it and of bringing it to a heated condition for spreading it upon the surface of the road. To work the material and furnish it in this heated condition on the spot, I have mounted my apparatus on a wheeled truck, and this, in connection with the necessary portable boiler (not shown) for furnishing steam, can be readily moved forward from point to point as the work progresses.

For carrying on operations on a scale of ordinary magnitude, I make a steam-tight tank about six feet in diameter and about seven feet high and either with or without double walls and bottom for a surrounding steam-jacket. The interior of this tank A is divided horizontally by grate-bars placed at a point below the center of the space, upon which is supported the rock introduced through the opening in the top of the tank. The cover $D D^x$ is held down tightly to the seat around this opening by a hinged clamp-bar, $D^2$, the bar being pivoted at the end $d^3$ and held by the screw-rod and fastening $d^4$ at the other end, as shown in Fig. 1. The steam-pipe L leads from the outside into the space $A'$ above the grate, and a second steam-coil, $L^x$, is placed in the lower space, $A^2$, just under the grate-bars.

The construction of coil shown in Fig. 8 is employed to secure uniform distribution of the steam-pressure through the entire coil, as well at the extreme ends of the coil as at those outlet-apertures in the coil which are nearer the supply end. Steam in sufficient quantity to melt and distribute the rock is directed through the charge of rock both in the principal space above the grate and up through the grate by these pipes, and the material when sufficiently reduced drops into the space $A^2$ below the grate, from which it is withdrawn through the outlet B at the rear of the tank from time to time.

The outlet is closed by a hinged cover, C, that is held down to a tight seat by the clamp-bar C×. The material when drawn from the lower part of the tank is in condition for use, as it is sufficiently moist and soft, besides being suitably disintegrated through the treatment it has received.

In most cases, and especially with the harder kinds of rock, the reduction and disintegration are facilitated by using a shaking or rocking grate-surface, and I have constructed and applied a grate-surface which is particularly adapted to this purpose, and will be found to keep the material from choking or clogging the bars and to cause it to drop into the receiving-space below as fast as it is sufficiently reduced.

In the construction the grate-bars F are suspended by links M M from the hooks M× M×, riveted to the side of the tank above the level of the grate-surface, and each bar sets in between two blocks, P P, that are fixed upon a rocking bar, R. There are two of these rocking bars extending transversely under the grate-bars, and their ends, being carried through the shell of the tank to the outside arms, are furnished with arms I I, to which connection from two cranks, T T×, on a shaft, T$^2$, is made by the rods H H×.

Connection is made of one half the number of grate-bars to one of these rocking bars and of the remainder to the other rocking bar in an alternate manner, so that every other grate-bar is connected to the same rocker.

The blocks m have open sockets p on the inner faces, and the grate-bar is provided with a lug or pin, t, on each side to fit loosely into the sockets, as clearly shown in the detail views of the drawings, Figs. 4, 5, and 6. The lower ends of the blocks are slotted and set outside of the rocking bar, which is rectangular in cross-section.

It will be noticed that through the rocking motion of the bars R R and by virtue of the pivoted connections t the movement of the grate-bars is an oscillating one, and they rise and fall in the longitudinal movement. The two bars R are also caused to rock in opposite directions, so that each grate-bar oscillates in a direction contrary to its neighbor, which movement facilitates the passage of the material through the grate-surface and prevents choking. Power for working this grate-surface is furnished by a crank-shaft and a small upright engine, W, mounted on the truck. This engine also supplies power to run an endless chain of buckets or elevators, V V, which are set at one side of the truck, for raising the material from the ground up to the top of the tank. Such elevator saves considerable time in charging the tank, and, being mounted on the truck a, it is always in position for operation as needed.

Figs. 2 and 3 show the manner in which the elevator is set and operated. The upright shaft is driven by miter-gears s' from the crank-shaft T, and a counter-shaft, s$^2$, driven from the upper end of the upright shaft, is carried over to the upper wheel or drum, y, of the elevator. Bearings for this shaft are furnished on the brackets u u, and the upright shaft is supported by the post B×, that is bolted to the side of the truck-frame.

The lower end of the elevator is supported by the side bars, Z, and braces Z× are carried out from the tank to the lower ends of the side bars.

Having thus described my invention, what I claim, and desire to secure by Letters Patent, is—

1. An apparatus for reducing and preparing bituminous rock for the purposes herein described, consisting of a steam-tight tank, A, with an inlet in the top and a drawing-off opening in the side at the bottom, which are fitted with steam-tight covers, and having its interior divided longitudinally by a grate-surface into an upper melting or reducing space, A', and a lower receiving and heating space, A$^2$, and having a steam-coil in each space, and connection of the same outside the tank with a steam-supply, as hereinbefore set forth.

2. An apparatus for reducing and preparing bituminous rock as a material for street-pavements, consisting of a steam-tight tank, A, having a grate-surface composed of grate-bars to which a rocking or oscillating motion is imparted, and having in the spaces above and below said grate-surface a steam-coil and connection thereof, with a steam-supply outside the tank.

3. In an apparatus for reducing bituminous rock, the combination of a steam-tight tank mounted on a wheeled truck, having its interior space divided longitudinally by a grate-surface, with an inlet from the outside into the upper space, and a draw-off opening from the lower space, a steam-coil in each space leading through the tank-shell to the outside, and connection thereof with a steam-supply, the elevator and engine mounted on the same truck, and connecting-shaft.

4. In an apparatus for reducing bituminous rock, the combination, with the tank A, of the rocking grate-surface consisting of the separated suspended grate-bars, the rocking bars R, slotted blocks P, and the crank-shaft and connecting-rods having connection with said rocking bars by crank-arms, for operation, as set forth.

In testimony that I claim the foregoing I have hereunto set my hand and seal.

GEORGE E. BELMOR. [L. S.]

Witnesses:
 CHAS. E. KELLY,
 C. W. M. SMITH.